July 5, 1960 S. LOEWE 2,943,805

CLAMPING DEVICE FOR TAPE SPOOLS OF MAGNETIC TAPE RECORDERS

Filed July 18, 1955

Inventor:
Siegmund Loewe

United States Patent Office 2,943,805

Patented July 5, 1960

2,943,805

CLAMPING DEVICE FOR TAPE SPOOLS OF MAGNETIC TAPE RECORDERS

Siegmund Loewe, 68 Ridge Road, Yonkers 5, N.Y.

Filed July 18, 1955, Ser. No. 522,508

Claims priority, application Germany Aug. 5, 1954

3 Claims. (Cl. 242—55.13)

For tape spools, especially magnetic tape spools which can be lifted from the recorder for the purpose of changing or similar operation in every winding condition, it is necessary to accommodate these spools in a magazine or in a similar device. It is possible to so form magnetic tape magazines that the spools contained in these magazines, removed from the recorder, can be locked by means of suitable clamping devices in such a way that the tape spools cannot turn or be shifted during transport. Up to now these clamping devices were so made that each of the tape spools in a magazine was pressed, at one point of its circumference against one or more fixed points of the magazine. This was done by means of a spring arrest device, provided with a braking surface.

The disadvantage of such a device lies in the fact that, when putting the spools into operation, i.e. after putting the magazine on a magnetic tape recorder, it is necessary to shift the centre of the spools a certain amount parallel to the spool axle so that the spool edge is not hampered when turning by the supporting surfaces against which it was previously pressed.

The present invention now gives an advantageous solution for the principle of tape spool clamping devices. By means of this solution, the locking and unlocking of the spools under maintaining of their operational position is effected by moving a locking device in the common spool plane. And the especial fact hereby is that the unlocking results only after the operational position of the spools has been attained and the locking when the spools are moved from their operational position.

The clamping device in accordance with the present invention is thereby characterized in that the locking means consist of two scissor-like movable parts, the arms of which embrace the two windings spools either on their edge or also on grooves, hubs or similar features, which are provided on the two spools or on a flange of these spools, said arms being rotatable round a center point at which they are attached to the magazine.

Figure 1:
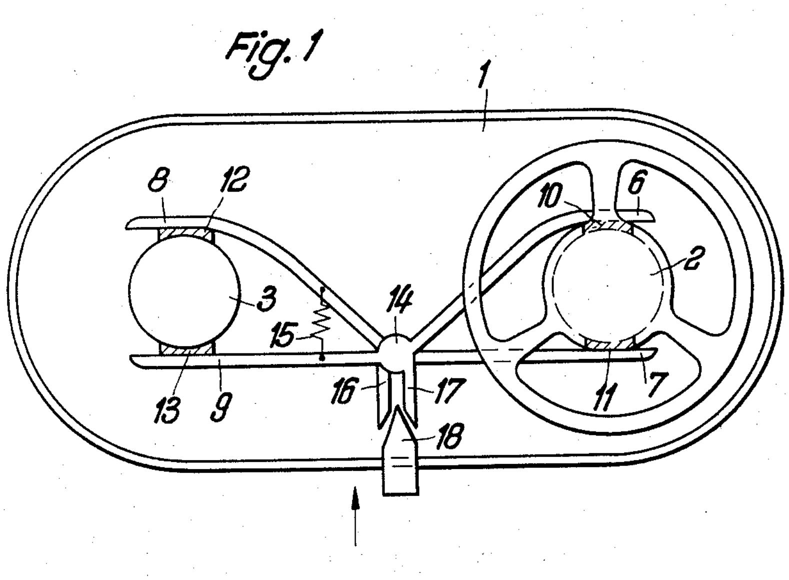
Figure 2:
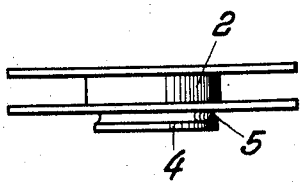

The invention is illustrated in more detail in the drawing by means of an exemplary embodiment. Fig. 1 is a top view of an opened magazine and Fig. 2 a side view of one of the two spools, contained in this magazine.

According to Fig. 1, the spool magazine is designated with 1. The two winding spools 2 and 3 are arranged in this magazine, whereby the spool 3 is represented without flanges for the purpose of simplification. Each spool contains, as can especially be seen from Fig. 2, on its lower side, an extended hub 4 with a groove 5. In this groove, the two scissor-like movable arms 6 and 7 or 8 and 9 seize and lock the spool so that it cannot be displaced preferably by means of friction surfaces 10, 11, 12, and 13. The arms 6, 7, 8, and 9 are connected in such a way that the arms 6 and 9 on the one side and the arms 7 and 8 on the other side each form a continuous piece which are rotatable scissor-like round the centre point 14. By means of a tension spring 15, the arms 6 to 9 are pressed with their friction surfaces 10 to 13 into the grooves 5 of the spool, when the magazine is in its inoperative position.

Should the spools be unlocked for putting the magazine 1 into operation, i.e. released for rotation, then a symmetrical spreading of the arms 6 and 7 on the one hand and 8 and 9 on the other hand takes place. For this purpose, the scissor parts are provided with cams 16 and 17 which have slanting bearing surfaces, facing each other, and, by way of example, with shifting of a control member 18 in direction of the arrow, are pressed apart or spread pivotally. This occurs against the force of the spring 15. The part 18 is, by way of example, given a bolt form and when shifted in the direction of the arrow, serves, at the same time, to fix the magazine 1.

The arms 6 to 9 can also have any other form. Especially, they can be so formed that their bearing surfaces do not—as represented—seize into the groove 5 but, by way of example, affect the outer edges of the spool flanges or the outer surface of the extended hub.

It is further to be mentioned that the device allows normal spools to be used since the extended hub 4 with the groove 5 need not be fixed tightly to the flange of the spool, so long as a rotation of the piece 4 with reference to the spool is prevented, which can e.g. be simply effected by a pin. This pin can, by way of example, be affixed on the part 4 which is not fixed to the spool 2 and seize in the spool so that a rotation of part 4 with reference to the spool is not possible. Then only a simultaneous rotation of both parts is possible and all normal spools can be used. Thus also in this case, when hub piece 4 is not fixed tightly to the spool, it is possible to assure the arrest of the spool with its tape roll by means of said piece 4.

What I claim is:

1. A clamping device for locking the winding spools within a magazine arrangement insertable into magnetic recording apparatus, comprising a magazine casing, a pair of winding spools within said casing, a pair of clamping levers within said casing, a tension spring attached with both its ends to said clamping levers, friction coatings on said clamping levers, and a control member for operating said clamping levers which are to be pivotally spread apart for the unlocked condition of said spools, said pair of clamping levers consisting of two scissor-like arms rotatable round and pivotally mounted at a common centre point, the ends of said clamping levers being supplied with said friction coatings and locking said winding spools by being pressed by said tension spring against the outer surfaces of said spools when the magazine is in inoperative position, said control member being shiftably arranged between said scissor-like clamping levers and being adapted to spread said clamping levers against the force of said spring, thus unlocking said spools as soon as said magazine casing is in operative condition.

2. A clamping device for locking the winding spools within a magazine arrangement insertable into magnetic recording apparatus, comprising a magazine casing, a pair of winding spools within said casing, a pair of clamping levers within said casing, a tension spring attached with both its ends to said clamping levers, friction coatings on said clamping levers, a pair of cams, and a control member for operating said clamping levers which are to be pivotally spread apart for the unlocked condition of said spools, said pair of clamping levers consisting of two scissor-like arms rotatable round and pivotally mounted at a common centre point, the ends of said clamping levers being supplied with said friction coatings and locking said winding spools by being pressed by said tension spring against the outer surfaces of said spools when the magazine is in inoperative position, said pair of cams being rigidly attached to said clamping levers, each cam to one of said levers, said control member being shiftably arranged between said cams and being adapted to spread said cams and thereby also said clamping levers against the force of said tension spring, thus unlocking said spools as soon as said magazine casing is in operative condition.

3. A clamping device for locking the winding spools within a magazine arrangement insertable into magnetic recording apparatus as claimed by claim 1, wherein said winding spools are supplied with an extended hub portion, the ends of said clamping levers with said friction coating embracing said hub portions for locking said winding spools.

References Cited in the file of this patent

UNITED STATES PATENTS

| | | |
|---|---|---|
| 1,462,604 | Lavalle | July 24, 1923 |
| 1,684,974 | Shaffer | Sept. 18, 1928 |
| 1,902,230 | Gundersen | Mar. 21, 1933 |
| 1,918,486 | Onos | July 18, 1933 |
| 2,195,829 | Shreffler | Apr. 2, 1940 |
| 2,209,178 | Taesler | July 23, 1940 |
| 2,233,798 | Robins | Mar. 4, 1941 |
| 2,451,662 | Cook | Oct. 19, 1948 |
| 2,574,218 | Lynch | Nov. 6, 1951 |
| 2,611,550 | Nygaard | Sept. 23, 1952 |
| 2,687,259 | Owens | Aug. 24, 1954 |
| 2,712,448 | Schroter | July 5, 1955 |
| 2,732,754 | Foster et al. | Jan. 31, 1956 |